US008447142B2

(12) United States Patent
Hirano

(10) Patent No.: US 8,447,142 B2
(45) Date of Patent: May 21, 2013

(54) IMAGE PROCESSING APPARATUS AND CONTROL METHOD THEREOF

(75) Inventor: Takayuki Hirano, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/154,707

(22) Filed: Jun. 7, 2011

(65) Prior Publication Data

US 2011/0305403 A1     Dec. 15, 2011

(30) Foreign Application Priority Data

Jun. 14, 2010   (JP) ................................ 2010-135502

(51) Int. Cl.
*G06K 9/32*       (2006.01)
(52) U.S. Cl.
USPC .......... 382/298; 382/274; 382/275; 358/3.26; 358/3.27
(58) Field of Classification Search
USPC ......... 382/260, 266, 274, 275, 298; 358/3.26, 358/3.27, 463
See application file for complete search history.

(56) References Cited

U.S. PATENT DOCUMENTS

| | | | | |
|---|---|---|---|---|
| 5,751,845 A | * | 5/1998 | Dorff et al. | 382/162 |
| 6,042,236 A | * | 3/2000 | Hatakeyama et al. | 353/31 |
| 6,084,978 A | * | 7/2000 | Taylor et al. | 382/154 |
| 6,118,584 A | * | 9/2000 | Van Berkel et al. | 359/463 |
| 7,308,139 B2 | * | 12/2007 | Wentland et al. | 382/181 |

FOREIGN PATENT DOCUMENTS

| | | |
|---|---|---|
| JP | 03-260638 A | 11/1991 |
| JP | 2009-218660 A | 9/2009 |

* cited by examiner

*Primary Examiner* — Yosef Kassa
(74) *Attorney, Agent, or Firm* — Canon U.S.A., Inc. IP Division

(57) ABSTRACT

Depth-of-field information is obtained from an image signal input from an external image source according to a predetermined acquisition timing. An image signal processing unit performs an image quality adjustment such that an edge enhancement level in an edge enhancement processing is increased adaptively with increasing depth of field of an image whereby the total quality of the image displayed is improved.

10 Claims, 3 Drawing Sheets

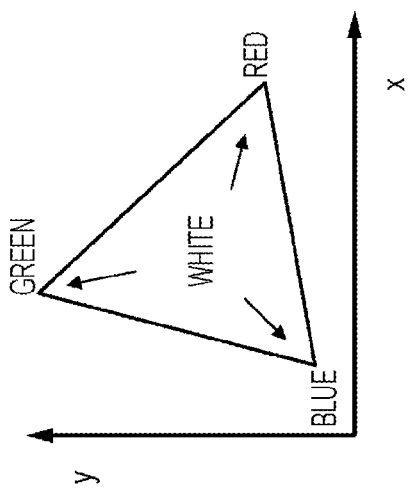
FIG. 2B
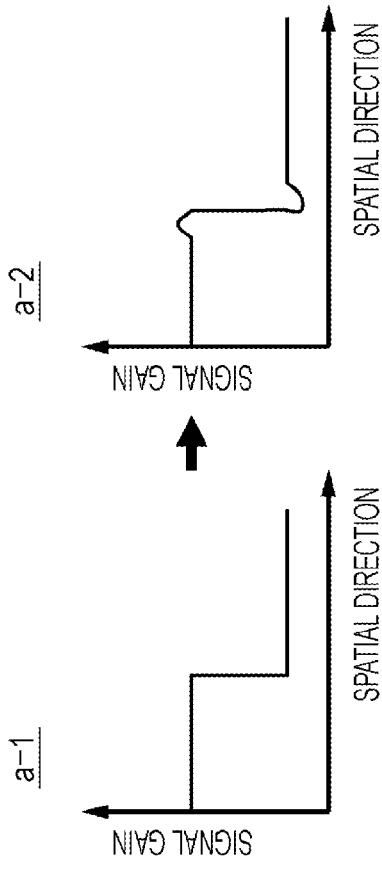
FIG. 2A
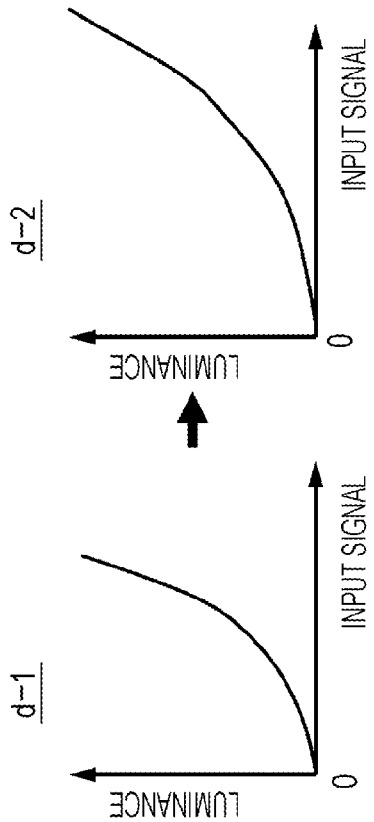
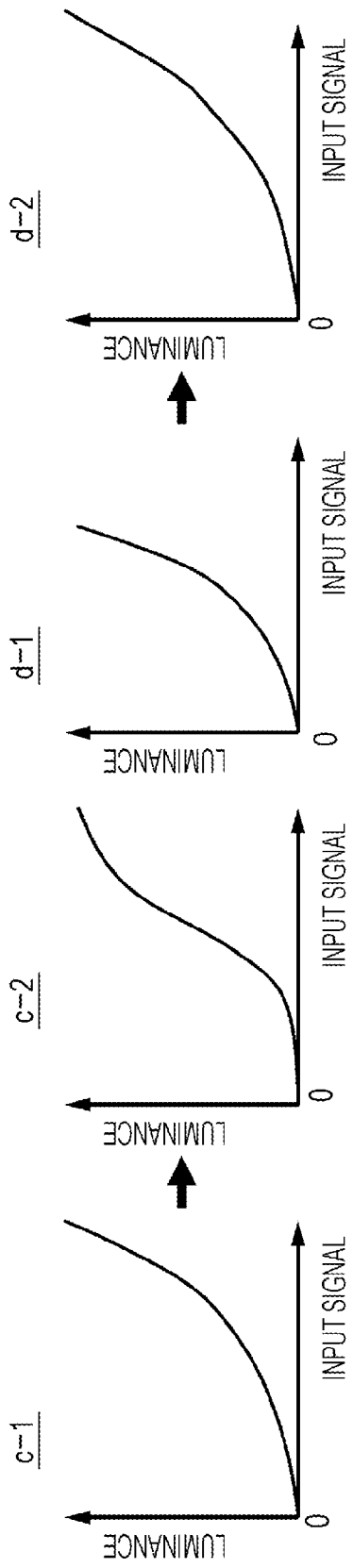
FIG. 2C
FIG. 2D

IMAGE PROCESSING APPARATUS AND CONTROL METHOD THEREOF

BACKGROUND OF THE INVENTION

1. Field of the Invention

The present invention relates to an image processing apparatus configured to perform an image quality adjustment processing on an image according to depth-of-field information associated with the image and display the resultant image, and relates to a method of controlling such an image processing apparatus.

2. Description of the Related Art

In an image display apparatus, to display an image with specified image quality, various image quality adjustment processing are performed on an input image signal.

Japanese Patent Laid-Open No. 2009-218660 discloses an image display apparatus configured to control the image quality (a luminance level, an edge enhancement level, a contrast, etc.) of an image displayed on a display connected to a camera in accordance with setting information (an F-number, an exposure condition, a shutter speed, etc.) of the camera. Japanese Patent Laid-Open No. 03-260638 discloses a camera having an electronic viewfinder capable of determining a focusing state based on a distance measurement value and a depth of field (hereinafter referred to as DOF) with respect to an object and processing an image such that edge enhancement is performed for a part of an image that is in an in-focus range while edges are blurred for parts of the image that are not in focus.

However, in conventional techniques, the strength of each image quality adjustment processing is not properly set depending on the photo information associated with images, and thus it is difficult to achieve a sufficiently high improvement in overall quality for a resultant image displayed.

In view of the above, the present invention provides a technique to improve overall quality of an image by properly performing an image quality adjustment such that the edge enhancement level in the edge enhancement processing is adaptively determined according to depth-of-field information of the image.

SUMMARY OF THE INVENTION

In an aspect, the present invention provides an apparatus configured to input an input image signal from an external image source and output a display signal to a display unit, including an obtaining unit configured to obtain information indicating a depth of field of an image from the input image signal, a processing unit configured to perform an image quality adjustment processing on an image signal extracted from the input image signal based on the information, and an output unit configured to output, based on the image signal that has been subjected to the image quality adjustment processing, the display signal according to which an image is displayed by the display unit, wherein the processing unit increases an edge enhancement level in an edge enhancement processing included in the image quality adjustment processing with increasing depth of field.

Further features of the present invention will become apparent from the following description of exemplary embodiments with reference to the attached drawings.

BRIEF DESCRIPTION OF THE DRAWINGS

FIGS. 2A to 2D are diagrams each illustrating an example of a manner in which an image quality adjustment processing is performed adaptively depending on a depth of field.

DESCRIPTION OF THE EMBODIMENTS

The present invention is described in further detail below with reference to embodiments in conjunction with the accompanying drawings. In embodiments of the present invention, an image quality adjustment is performed such that an edge enhancement level in an edge enhancement processing is increased adaptively with increasing depth of field (DOF) of an image.

Figure 1:
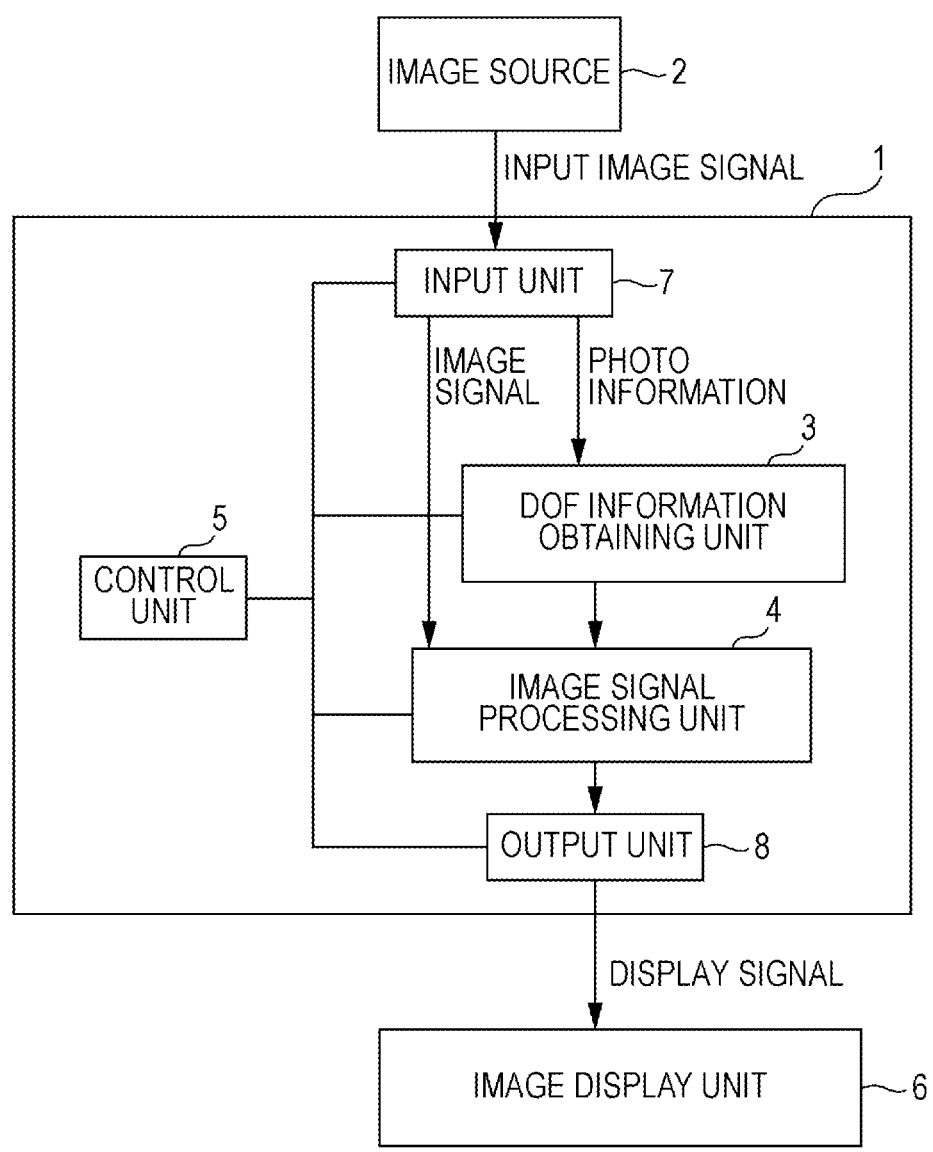
FIG. 1 is a block diagram illustrating an image processing apparatus according to an embodiment of the present invention.

FIG. 1 illustrates a configuration of an image processing apparatus 1 according to an embodiment of the present invention. An input unit 7 inputs, from an external image source 2, an input image signal (input signal, external signal) including photo information associated therewith. The photo information is input at predetermined intervals for every predetermined number of frames of image signal. Alternatively, photo information may be input on a particular occasion such as a change in scene or chapter. The image source 2 may be a digital television broadcast, a video playback apparatus, an Internet site that provides contents, etc. The photo information is input to a DOF-information obtaining unit 3, and the DOF is calculated from the photo information according to a formula shown below.

DOF=front DOF+rear DOF front DOF=diameter of permissible circle of confusion×F-number×object distance$^2$/(focal length$^2$+diameter of permissible circle of confusion×F-number×object distance)

rear DOF=diameter of permissible circle of confusion×F-number×object distance$^2$/(focal length$^2$−diameter of permissible circle of confusion×F-number×object distance)

focal distance=length of diagonal line of image sensor/(2×tan(angle of field/2))

diameter of permissible circle of confusion=length of diagonal line of image sensor/constant (normally 1300 to 1500)

The calculated DOF is output as DOF information from the DOF-information obtaining unit 3 to an image signal processing unit 4. The image signal processing unit 4 performs an edge enhancement processing, a saturation (colorfulness) adjustment processing, a luminance curve adjustment processing, and a black level adjustment processing according to the DOF information. Via these image quality adjustment processing, the vividness of the image is enhanced when the DOF is deep, while the vividness of the image is suppressed when the DOF is shallow.

More specifically, when the DOF is deep, the image quality adjustment processing is performed such that the edge enhancement level is increased in the edge enhancement processing. In the adjustment processing, the edge enhancement processing may be combined with other processing as described below. For example, the adjustment is performed such that the edge enhancement is increased, the saturation (colorfulness) is increased, the luminance curve is set to be S-shaped, and the black level is enhanced. On the other hand, when the DOF is shallow, the edge enhancement is reduced, the saturation is reduced, the luminance curve is set to be monotonic, and the black level is not enhanced.

The adjustment may be performed such that when the DOF is shallow, the image quality adjustment is performed according to default conditions, while when the DOF is deep, the adjustment levels are enhanced. That is, the edge enhancement level is increased, the saturation is increased, the curvature of the S-shaped part of the luminance curve is increased, and the gradient of the luminance curve is reduced in the low luminance range depending on the DOF.

Note that the luminance curve adjustment is performed such that the shape of the gamma curve is changed, while in the black level adjustment, the shape of the gamma curve is maintained and the gradient of the curve in the low luminance range is changed.

After the signal processing on the image signal by the image signal processing unit 4 is complete, the resultant image signal is output as a display signal from an output unit 8 to an image display unit 6. A control unit 5 controls various processing blocks including the input unit 7, the DOF-information obtaining unit 3, the image signal processing unit 4, and the output unit 8 such that they operate cooperatively.

FIGS. 2A to 2D are diagrams each illustrating an example of a relationship between DOF and an image quality adjustment processing. FIG. 2A illustrates a manner in which the edge enhancement processing is performed. When the DOF is deep, an input signal (a-1) is converted into a signal (a-2) such that edges of a displayed image are enhanced. FIG. 2B illustrates a manner in which the saturation adjustment process is performed. When the DOF is deep, the adjustment process is performed such that the saturation is increased (i.e., the hue is shifted in a direction denoted by an arrow). More specifically, ratios among R, G, and B signals included in the input signal are adjusted. For example, to enhance the R (red) color, the R signal is increased while maintaining the G and B signals, or the G and B signals are reduced while maintaining the R signal. FIG. 2C illustrates a manner in which the luminance curve adjustment is performed. Normally, the input signal is subjected to a luminance correction process according to a luminance curve given by a monotonic curve with $\gamma=2.2$ (c-1). In contrast, when the DOF is deep, an S-shaped luminance curve (c-2) is used in the luminance correction process. FIG. 2D illustrates a manner in which the black level adjustment processing is performed. Normally, the black level adjustment is performed according to a luminance curve with $\gamma=2.2$ (d-1). When the DOF is deep, $\gamma$ is increased to 2.5 to 3.0 (d-2) such that the luminance changes gradually in a low luminance range.

The control unit 5 selects the edge enhancement processing from the four adjustment processes described above and makes the image signal processing unit 4 perform the edge enhancement processing. Alternatively, the control unit 5 may select at least two processes including the edge enhancement processing and makes the image signal processing unit 4 perform the selected processes. The image signal processing unit 4 performs the edge enhancement processing and other adjustment processes in series or in parallel on the same image signal.

The reason why the edge enhancement processing is employed as the image quality adjustment processing that is performed depending on the DOF is that the edge enhancement processing allows for the most effective control to achieve high vividness of images. Another reason is that the edge enhancement processing has a relatively low visual correlation with other image quality adjustment processing, and thus a combination of the edge enhancement processing and other image quality adjustment processing can lead to an increase in the overall image quality.

The image signal is digital data of a moving or still image expressed in 8 or more bits. The DOF information is calculated, according to the formula described above, from photo information indicating image capturing conditions employed when an image is captured by a digital camera or a video camera used as the image capturing apparatus. In a case where DOF information is included as associated information in a stored image content, the DOF-information obtaining unit 3 may extract the DOF information from the image content and output it to the image signal processing unit 4.

Figure 3A:
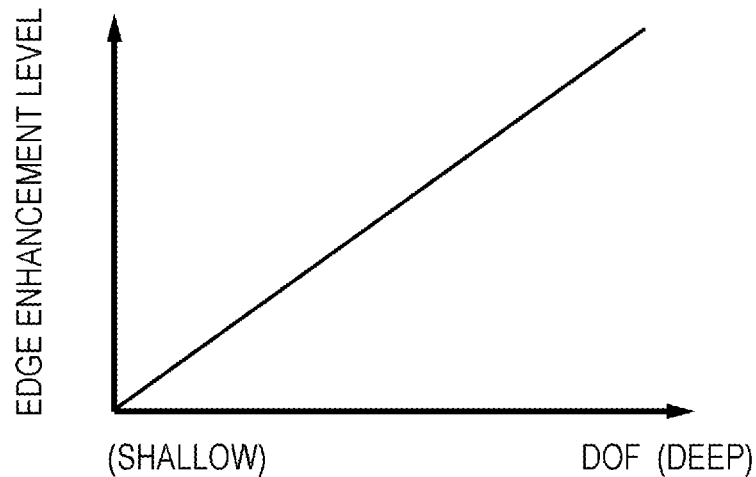
FIGS. 3A and 3B are diagrams illustrating manners in which the level of edge enhancement is changed depending on a depth of field.
Figure 3B:
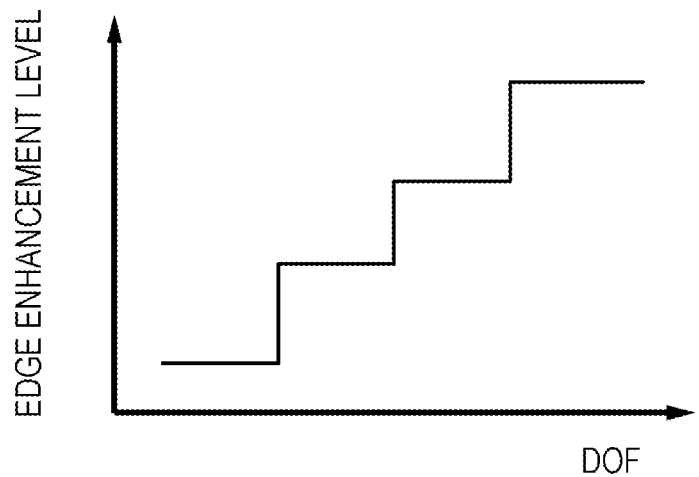

FIGS. 3A and 3B illustrate manners in which the edge enhancement level is set depending on the DOF. The edge enhancement level is a value obtained by multiplying the second order differential of the image signal by a predetermined gain. FIG. 3A illustrates a linear or curved conversion characteristic applied to a usual moving image. The degree of the change in the edge enhancement level is given by the gradient of this line or curve, and may be properly set depending on a type of a moving image displayed according to the input image signal or may be set depending on a display mode set according to the type of the image. For example, in a case where the type of the image is a movie and the display mode is a cinema mode, the gradient is set to be smaller than that for other genres such as sports, varieties, etc. For images of game contents, the gradient is set to be greater than that for television program images. In the case of television programs, the image type may be acquired from program information transmitted as broadcast data from broadcast stations. It may be possible to determine whether the image is of a game content by determining which input terminal is used to input the image that is displayed.

FIG. 3B illustrates a manner in which the edge enhancement level is changed stepwise, which may be applied to a still image. This makes it easy to visually recognize a difference in edge enhancement level among images, which leads to an increase in vividness of still images when they are displayed sequentially. In the case of still images, the DOF of each image may be obtained from Exif (Exchangeable Image File) information associated with the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135502 filed Jun. 14, 2010, which is hereby incorporated by reference herein in its entirety.

What is claimed is:

1. An apparatus configured to input an input image signal from an external image source and output a display signal to a display unit, comprising:
    an obtaining unit configured to obtain information indicating a depth of field of an image from the input image signal;
    a processing unit configured to perform an image quality adjustment processing on an image signal extracted from the input image signal based on the information; and
    an output unit configured to output, based on the image signal that has been subjected to the image quality adjustment processing, the display signal according to which an image is displayed by the display unit,
    wherein the processing unit increases an edge enhancement level in an edge enhancement processing included in the image quality adjustment processing with increasing depth of field.

2. The apparatus according to claim 1, wherein the image quality adjustment processing includes a combination of the edge enhancement processing and at least one process selected from a group including a saturation adjustment process, a luminance curve adjustment processing, and a black level adjustment processing.

3. The apparatus according to claim 2, wherein when the depth of field is deep, the processing unit performs a process selected from a group including a process of adjusting a luminance curve so as to be S-shaped, a process of increasing a saturation, and a process of increasing a gamma value.

4. The apparatus according to claim 1, wherein the processing unit changes the edge enhancement level such that the edge enhancement level increases monotonically or stepwise with increasing depth of field.

5. The apparatus according to claim 1, wherein the processing unit performs the image quality adjustment processing such that a magnitude or a shape of the change in the edge enhancement level with the depth of field is varied depending on a type of the input image signal or a display mode corresponding to the type of the input image signal.

6. A method of controlling an apparatus configured to input an input image signal from an external image source and output a display signal to a display unit, comprising:
    acquiring information indicating a depth of field of an image from the input image signal;
    performing an image quality adjustment processing on an image signal extracted from the input image signal based on the information; and
    outputting, based on the image signal that has been subjected to the image quality adjustment processing, the display signal according to which the image is displayed by the image display unit,
    wherein an edge enhancement level in an edge enhancement processing included in the image quality adjustment processing is increased with increasing depth of field.

7. The method according to claim 6, wherein performing quality adjustment processing includes combining the edge enhancement processing with at least one process selected from a group including a saturation adjustment process, a luminance curve adjustment processing, and a black level adjustment processing.

8. The method according to claim 7, further comprising, when the depth of field is deep, performing a process selected from a group including a process of adjusting a luminance curve so as to be S-shaped, a process of increasing a saturation, and a process of increasing a gamma value.

9. The method according to claim 6, wherein the edge enhancement processing changes the edge enhancement level such that the edge enhancement level increases monotonically or stepwise with increasing depth of field.

10. The method according to claim 6, wherein the image quality adjustment processing performs such that a magnitude or a shape of the change in the edge enhancement level with the depth of field is varied depending on a type of the input image signal or a display mode corresponding to the type of the input image signal.

* * * * *